June 14, 1960 B. CUTLER ET AL 2,941,199
HIGH ACCURACY EXPANDED SECTOR DISPLAY AND
MEANS AND TECHNIQUES FOR PRODUCING SAME
Filed Dec. 14, 1953
2 Sheets-Sheet 2

BURTON CUTLER,
GEORGE B. CRANE,
INVENTORS

BY

ATTORNEYS

United States Patent Office 2,941,199
Patented June 14, 1960

2,941,199

HIGH ACCURACY EXPANDED SECTOR DISPLAY AND MEANS AND TECHNIQUES FOR PRODUCING SAME

Burton Cutler, Los Angeles, and George B. Crane, Redondo Beach, Calif., assignors to Gilfillan Bros. Inc., Los Angeles, Calif., a corporation of California Filed Dec. 14, 1953, Ser. No. 397,842

8 Claims. (Cl. 343—11)

The present invention relates to indicators useful in radar systems wherein it is desired to produce an expanded display of a region scanned by a radiated beam so that resulting echo signals producing indications in such display may be more accurately studied and the position of targets causing such echo signals to be more accurately located.

Briefly, the present invention is described in conjunction with a conventional plan position indicator system (P.P.I.) in which, as is well known, an anenna is rotated continuously through 360° and a corresponding 360° presentation or display is produced representing the area scanned by the beam. The conventional P.P.I. display is produced by recurrent sweeps of the cathode ray beam recurrnetly sweeping out from the center of the display, successive sweeps being displaced angularly a distance equal to the corresponding angular displacement of the antenna beam. The present invention allows effectively a sector of a P.P.I. display to be magnified to any desired degree and as shown herein such magnification or expansion is essentially an angular type of expansion with one degree angular displacement of the radiated beam corresponding to ten degrees in the display. Further, a particular section of the P.P.I. display may simultaneously be expanded in range using a cathode ray tube with a diameter smaller than the diameter of the cathode ray tube producing the conventional P.P.I. display. In producing such expanded presenation or display, radial sweep producing means are used but, in accordance with an important feature of the present invention, the origin of such sweeps is effectively displaced to a single point outside of the viewing surface of the cathode ray tube.

It is, therefore, a general object of the present invention to provide means and techniques for achieving the above indicated results.

A specific object of the present invention is to provide improved means and techniques whereby a selected portion of a plan position indicator display may be magnified or expanded.

Another specific object of the present invention is to provide improved means and techniques for obtaining an expanded display using simple and easily adjusted apparatus.

Another specific object of the present invention is to provide apparatus for obtaining an expanded presentation on the face of a cathode ray tube which is smaller in diameter than a related tube in a plan position indicator system.

Another specific object of the present invention is to provide indicating apparatus of this character in which two cathode ray tubes are used, one for providing a conventional P.P.I. display and the other for producing an expanded represnetation of a portion of the P.P.I. display, so arranged that the portion of the display which is expanded is suitably indicated in the P.P.I. display.

Another specific object of the present invention is to provide an indicating system of this character in which a plan position indicator system is associated with an auxiliary cathode ray tube in such a manner that such auxiliary tube is capable of producing an expanded representation of a selected portion of the P.P.I. display, such selected portion being entirely within the choice of an operator.

Another specific object of the present invention is to provide an indicating system of this character in which the center of the expanded presentation is indicated electronically on the face of the associated P.P.I. display.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
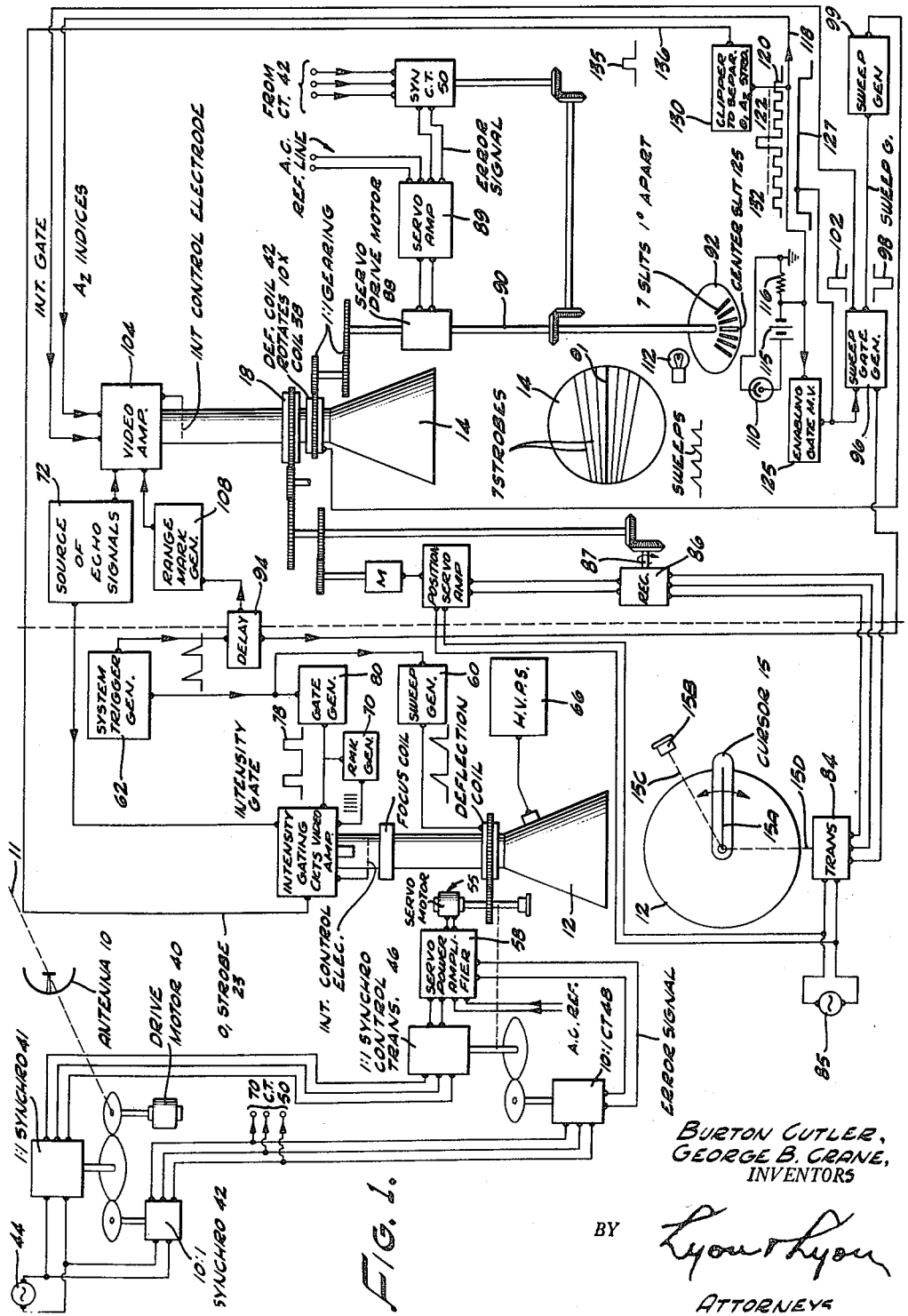
Figure 1 illustrates a system embodying features of the present invention.

The system shown in Figure 1 includes a conventional rotating antenna 10 for producing a beam 11 of radiated energy, such beam effectively being rotated through 360° with the area scanned by such beam in its motion, being presented on the face of the cathode ray tube 12 as a conventional P.P.I. display. Such P.P.I. display is represented generally in Figures 3 and 4. In accordance with important features of the present invention a portion of the area represented in the P.P.I. display is magnified or expanded both angularly and in range and appears on the auxiliary cathode ray tube 14.

Figure 2:
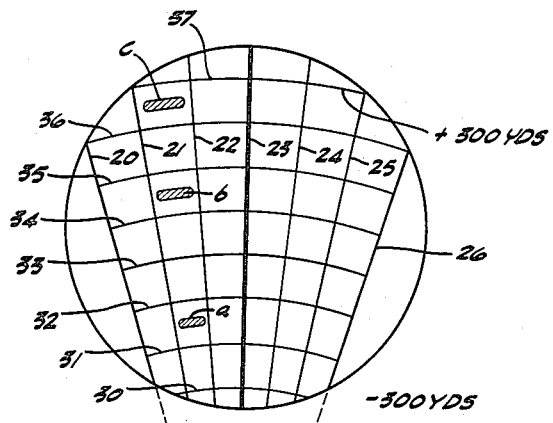
Figure 2 illustrates the expanded or magnified presentation or display produced using the system illustrated in Figure 1.

The deflection coil 38 of the tube 12 is rotated in synchronism with rotation of the antenna 10 so that angular displacements of the antenna beam 11 cause equal angular displacements of the cathode beam sweeps 12A which define the P.P.I. display. The deflection coil 42 of the tube 14 is also rotated in synchronism with movement of the antenna 10 but at ten times the speed so that a displacement of one degree of the antenna beam 11 corresponds to a displacement of ten degrees of a sweep defining the display on tube 14. Further, in accordance with another important feature of the present invention the cathode beam sweeps in tube 14 effectively originate at a common point lying outside of the circumference of the viewing surface of the tube as shown in Figure 2.

Figures 3, 4:
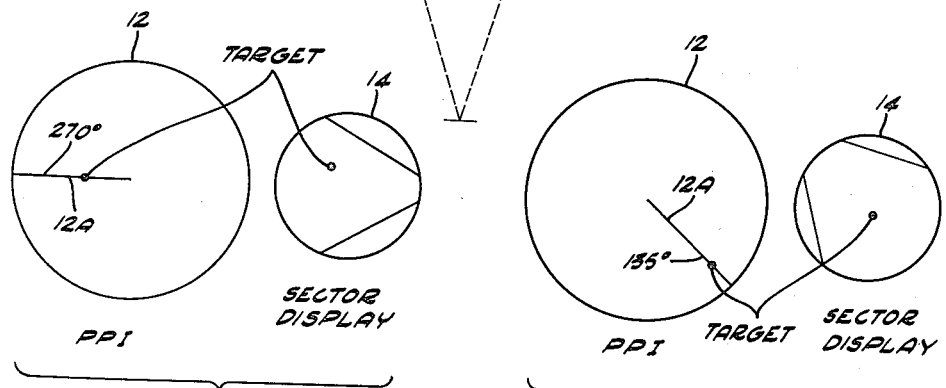
Figures 3 and 4 illustrate the positions the displays on the auxiliary cathode ray tube assume for the conditions when the center strobe of the corresponding P.P.I. display has an angular position of 270° and 135° respectively.

Any portion of the area represented by the PPI display on tube 12 may be selected for expansion or magnification by an operator manually moving the mechanically positioned cursor 15 and by doing so the orgin of the sweeps produced in tube 14 is shifted as indicated in Figures 3 and 4, such shifting being obtained due to automatic shifting of the off-center coil 18 associated with tube 14. The display produced on tube 14 comprises essentially seven visibly intensified radial lines (a portion only of which are rendered visible) each representing an angular distance of one degree, but in fact being separated by ten degrees. These radial lines are designated by the reference numerals 20, 21, 22, 23, 24, 25 and 26. The display on tube 14 includes also the series of range marks 30, 31, 32, 33, 34, 35, 36, such range marks being displaced a distance corresponding to one hundred yards. The center strobe 23 termed the $theta_1$ strobe is intensified more than the other strobes and is used to intensify the corresponding sweep 12A in the display shown in Figures 3 and 4.

Details of the system shown in Figure 1 for accomplishing these general purposes are now described.

The antenna 10 is driven by the motor 40 which, through a conventional servo system causes synchronous rotation of the deflection coil 38. The motor 40 drives a one to one synchro 41 and a ten to one synchro 42, each of which is supplied with alternating current from the source 44. The output of the synchro 41 is applied to a one to one synchro transformer 46, while the output of the synchro 42 is applied to the ten to one control transformer 48 as well as to the control transformer 50. These control transformers 46 and 48 each have their rotatable control elements mechanically coupled to the shaft of the servo motor 55 driving the coil 38. The motor 55 is driven by the output of the servo power amplifier 58 which, in conventional manner, is coupled electrically to the control transformers 46 and 48 as well as to an alternating current reference voltage source. The deflection coil 38 is coupled to the sweep generator 60 which is triggered periodically in timed relationship with pulses emitted from the antenna 10 in accordance with triggers supplied from the system trigger generator 62.

The intensity of the cathode beam in the tube 12 supplied with high voltage from the high voltage power supply 66, is, in general, intensified in the conventional manner in accordance with range mark pulses developed in the range mark generator 70, and with echo signals supplied from the source 72 which is considered to be a conventional radar receiver associated in conventional manner with the antenna 10.

Also, the cathode beam of tube 12, in accordance with one feature of the present invention, is intensity modulated in timed relationship with development of the center strobe 23 in Figure 2.

In order that these signals may cause visible indications at the proper time only, intensity gates 78 developed in timed relationship with the sweeps are developed in the gate generator 80 and applied to a suitable intensity control electrode of the tube 12.

The tube 12 has associated therewith a cursor 15 which is a transparent element having an index line 15A thereon, such cursor being rotatably supported at a point on the central axis of the tube 12 and being rotatable manually to different adjusted positions upon rotation of the knob 15B. This knob 15B is mechanically interlocked, as designated by the dotted lines 15C and 15D, to a movable shaft of a Selsyn transmitter 84 which is energized by the alternating current source 85 and which is interconnected in standard fashion with the Selsyn receiver 86 having the output shaft 87 mechanically interconnected through suitable gearing to the off center coil 18 whereby the coil 18 assumes a position corresponding to the adjusted position of the cursor 15. The element 18 instead of being a coil through which a continuous current flows may simply be a permanent magnet achieving the same magnetic result, namely, that of off centering the sweeps produced in tube 14 to a point outside the circumference of the tube 14 as indicated in Figure 2.

The deflection coil 42 of tube 14 is continuously rotated in synchronism with movement of the antenna 10 but with an angular speed ten times the angular speed of rotation of the beam 11 produced by the antenna 10. For increased accuracy, the coil 42 may be directly coupled mechanically to the antenna 10 through suitable gearing but accurate results may likewise be obtained using a conventional servo follow up system as shown in Figure 1. The coil 42 is driven by the servo drive motor 88 which receives energy from the servo amplifier 89 which is energized in conventional manner and this involves the application of an alternating current reference voltage to the amplifier 89 and an error signal developed at the output of the control transformer 50. The control transformer 50 has its rotatable shaft interconnected through suitable gearing to the shaft of the drive motor 88. Such shaft 90 has also mounted thereon a disk 92 with seven radial slots or slits therein, there being one slot or slit for each angle index mark 20, 21, 22, 23, 24, 25 and 26 which are produced using the slotted disk 92 in the manner described hereinafter.

Radial sweeps are produced in the tube 14 in timed relationship with triggers from the generator 62, but such sweeps are delayed with respect to sweeps generated in tube 12, using delay means 94 which serves to delay the triggers applied to the sweep gate generator 96 the desired amount. The output of the sweep gate generator 96 in the form of a gate 98 is applied to the sweep generator 99, the output of which is applied to the rotating deflection coil 42. The gate generator 96 develops also an enabling gate 102 which is applied through the video amplifier 104 to a suitable intensity control electrode of the tube 14 so as to produce or render visible the desired indications on tube 14 at the proper time. These indications are indications of echo signals applied from the source of echo signals 72 to the video amplifier, range marks developed in the range mark generator 108 represented by the curved lines in Figure 2 as well as the azimuth index marks represented by the radial lines in Figure 2. The range marks are delayed since the trigger which initiates the production of such marks is delayed by the aforementioned delay means 94.

The azimuth index marks are produced using the photoelectric cell 110 which is illuminated in accordance with the light produced by the constantly energized lamp 112 transmitted recurrently through the slots or slits of the rotating disk 92, such disk 92 of course being disposed mechanically between the source 112 and the photocell 110. The photocell 110 is serially connected with the voltage source 115 and the load resistance 116 so as to produce the voltage variation on the lead 118 represented by the voltage variation 120, which comprises seven pulses, the center one of which represented by the reference numeral 122 is of appreciably larger intensity than the other pulses. This relatively large pulse 122 is produced by the center slit 125 in the disk 92, such central slit being larger to allow the transmission of more light than the other slits. This voltage variation 120, the azimuth index signals are applied to an intensity control electrode of the tube 14. This voltage variation 120 on lead 118 is applied also to the enabling gate multi-vibrator 125 which operates to initiate the start of the gate 127 in accordance with the first pulse of the series of pulses represented by the voltage variation 120; and, the multi-vibrator stage 125 "times" itself out automatically a short time after the last pulse in the series represented by the voltage 120 so as to form the enabling gate 127 which has a duration substantially equal to the time required for the production of the seven pulses and such enabling gate 127 of course appears contemporaneously with the production of the voltage 120. This enabling gate 127 is applied to the sweep gate generator 96 which is effective to produce the aforementioned intensity gate 102 and the sweep gate 98 only when the enabling gate 127 is present. By these means, sweeps are produced and rendered visible on the cathode ray tube 14 only within the limits defined by the radial lines 20 and 26 in Figure 2. The central pulse 122 of relatively large intensity causes the central strobe 23 in Figure 2 to be heavier than the other strobes. It is desired to produce a similar strobe on the P.P.I. indicator tube 12 effected only by such center pulse 122, and for that purpose a conventional clipping or clipper stage 130 has its input terminal connected to the lead 118. The clipping level of the stage 130 is indicated by the dotted line 132 so that only one pulse, represented by the pulse 135 appears on the output lead 136, such lead 136 being coupled to an intensity control electrode of the tube 12.

In operation of the system shown in Figure 1, assuming that it is desired to magnify that portion of the P.P.I. display adjacent the 270° strobe as indicated in Figure 3, the cursor 15 is rotated by knob 15B to the 270° position and this automatically causes the off center coil 18, which is driven by the Selsyn system including the elements 84 and 86, to a position where the origin of the sweeps produced in tube 14 is shifted and the display indicated in Figure 3 is produced. A center strobe, i.e., the so-called theta₁ strobe produced electronically in tube 12 and such strobe is coincident with the index line 15A painted or etched on the otherwise transparent cursor 15. Similarly, if it is desired to magnify that portion of the display adjacent the 135° position of tube 14, the cursor 15 is manually rotated to such 135° position and the results indicated in Figure 4 are obtained.

For increased accuracy, the slotted disk 92 may be directly mechanically coupled to the antenna 10 instead of through a servo mechanism as illustrated.

The tube 14 may be a so-called five-inch cathode ray tube with a four and one-half inch usable diameter and the off centering is such that the origin of the sweeps lies beyond the useful edge of the screen of the tube 14 while the system as described allows a 6° angular sector in space to be expanded to cover a 60° angle on the face of the tube 14, other degrees of expansion may of course be obtained using ratios other than ten to one.

Figure 2 illustrates echo signals a, b and c from three isolated targets and it is observed that there is no spot size limitation associated with these returning signals. The range or angle intervals from the reference point on the expanded display is either added to or subtracted from the readings displayed on associated mechanical counters (for both azimuth and range) depending on the location of the target on the expanded display. Range is measured with respect to the leading edge of the target display whereas azimuth angle is measured with respect to the center of the target.

It is understood that while off centering to a degree wherein the origin of sweeps is outside the circumference of the viewing screen is used, the center of the sweeps may be so adjusted that it is likewise visible and this involves changing the amount of continuous current flowing through the off center coil 18 or changing the strength of the permanent magnet in case a permanent magnet is used for off centering purposes.

Furthermore, while it is preferred to use a photoelectric cell in conjunction with a slotted disk as described above, it is conceivable that other means may be used to develop the series of pulses represented by the voltage 120 in timed relationship with movement of the scanning antenna.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In an arrangement of the character described, an antenna continuously rotating, a first cathode ray tube having first beam deflecting means synchronously rotated at the same angular speed as said antenna, a second cathode ray tube having second beam deflecting means synchronously rotated with said beam deflecting means but at an increased angular speed, manually operated cursor means operatively associated with said first cathode ray tube, and beam off-centering means associated with said second cathode ray tube and positioned in accordance with such cursor means.

2. Indicating apparatus of the character described comprising, in combination, a first cathode ray tube having first beam deflecting means associated therewith, a second cathode ray tube having second beam deflecting means associated therewith, means synchronously rotating said first and second beam deflecting means but with said second beam deflecting means rotating at a higher speed than said first beam deflecting means, manually operated cursor means associated with said first tube, cathode beam off-centering means associated with said second tube and positioned in accordance with movement of said cursor means.

3. Indicating apparatus comprising, in combination, a first cathode ray tube having first beam deflecting means, a second cathode ray tube having second beam deflecting means, adjustable means whereby the center of sweeps produced by said second deflecting means of said second tube is adjusted, means synchronously operating said first and second beam deflecting means but with said second beam deflecting means moving the cathode beam of the second tube at a higher speed when the cathode beam of the first tube is moved by said first beam deflecting means, indicating means associated with said first tube, means for moving said indicating means, and means operated automatically upon operation of the last mentioned means for adjusting said adjustable means to thereby alter the position of said center of sweeps.

4. Indicating apparatus of the character described, the combination comprising, a first cathode tube having first beam deflecting means, a second cathode tube having second beam deflecting means, means rotating said first and second beam deflecting means in synchronism but with said second beam deflecting means rotating at a speed higher than the speed of the first beam deflecting means, means associated with said first tube for positioning the central position of the cathode beam of a second tube from its off-center position, said second beam deflecting means being effective to produce sweeps of the cathode beam of the second tube from said off-center position, means operated synchronously with said second beam deflecting means for producing a series of pulses, means applying said series of pulses to an intensity control electrode of said second tube, and means applying at least one of said pulses to an intensity control electrode of said first tube.

5. In an arrangement of the character described, the combination comprising, a first cathode ray tube having first beam deflecting means, a second cathode ray tube having second beam deflecting means, means for rotating said first and second beam deflecting means in synchronism but with said second beam deflecting means rotating at a speed greater than said first beam deflecting means, means operating synchronously with said second beam deflecting means for producing a series of pulses, means applying said series of pulses to an intensity control electrode of said second tube, means applying at least one of said pulses to an intensity control electrode of said first tube, beam off-centering means associated with said second tube, and manually operated cursor means associated with said first tube, and means coupled between the cursor means and said beam off-centering means for positioning said beam off-centering means in accordance with positioning of said cursor means.

6. In an indicating apparatus of the character described, the combination comprising, a first cathode ray tube having first beam deflecting means, a second cathode ray tube having second beam deflecting means, means synchronously operating said first and second beam deflecting means but with said second beam deflecting means operating at a higher speed than said first beam deflecting means, means deriving a series of pulses recurrently in and during movement of said second beam deflecting means, means for applying said series of pulses to an intensity control electrode of said second tube, and means applying only the center of said series of pulses to an intensity control electrode of said first tube.

7. An indicating apparatus of the character described, a cathode ray tube having beam deflecting means, means deriving a series of pulses recurrently and in timed relationship with operation of said beam deflecting means, means applying said series of pulses to an intensity control electrode of said tube, and means for positioning the central position of the cathode beam of said tube to a position off center of the center of the screen of said tube, said beam deflecting means being effective to sweep the cathode beam from said off-center position, and means for rendering visible the indications produced by said cathode beam only during the time said series of pulses occur.

8. In an arrangement of the character described, the combination comprising, a first cathode ray tube having first beam deflecting means, a second cathode ray tube having a second beam deflecting means, first sweep generating means associated with said first beam deflecting means, second sweep generating means associated with said second beam deflecting means, a source of triggers, means coupling said source to said first sweep generating means, delay means coupling said source to said second sweep generating means to delay the generation of the sweeps in said second tube with respect to the generation of the sweeps in said first tube, beam off-centering means associated with said second tube, cursor means associated with said first tube, means interconnecting said cursor means and said beam off-centering means whereby said beam off-centering means is positioned in accordance with positioning of said cursor means, means for developing a series of pulses in accordance with operation of said second beam deflecting means, means for applying said pulses to an intensity control electrode of said second tube, and means for applying only one of said pulses to an intensity control electrode of said first tube.

References Cited in the file of this patent

UNITED STATES PATENTS

| | | |
|---|---|---|
| 2,422,697 | Meacham | June 24, 1947 |
| 2,585,868 | Spaulding | Feb. 12, 1952 |
| 2,640,984 | Sherwin | June 2, 1953 |
| 2,682,657 | Haworth | June 29, 1954 |
| 2,754,508 | Ehrenfried | July 10, 1956 |

OTHER REFERENCES

"The MPG-1 Radar," by Strauss et al., Electronics, for March 1946, pp. 140-147.

Sector Display Indicators, vol. 22, Radiation Laboratory Series, chapter 14, pp. 482 to 515.